June 14, 1927.
H. M. SUTTON ET AL
1,632,520
PROCESS OF AND APPARATUS FOR SEPARATING, CLEANING, AND GRADING
ALL KINDS OF NUTS, CEREALS, AND LEGUMES
Original Filed Dec. 13, 1919    7 Sheets-Sheet 2
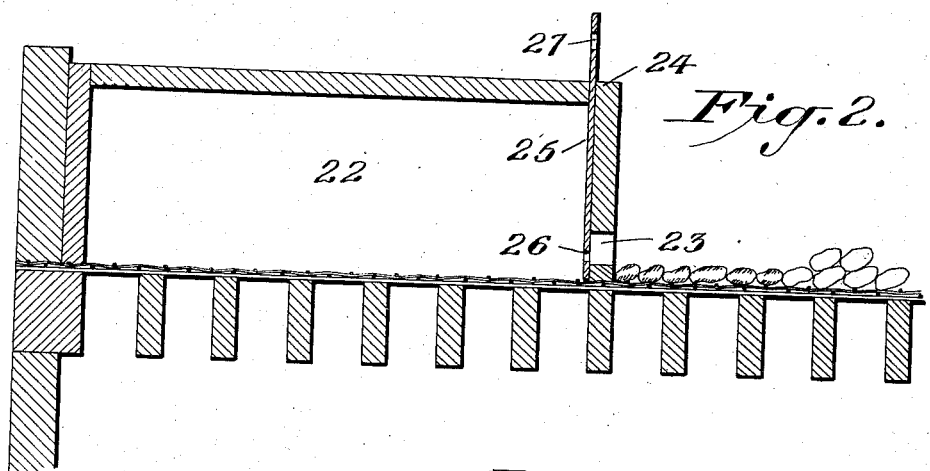
Fig. 2.
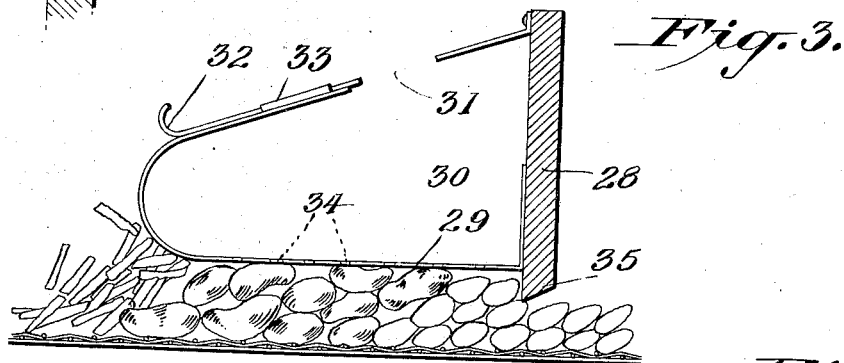
Fig. 3.
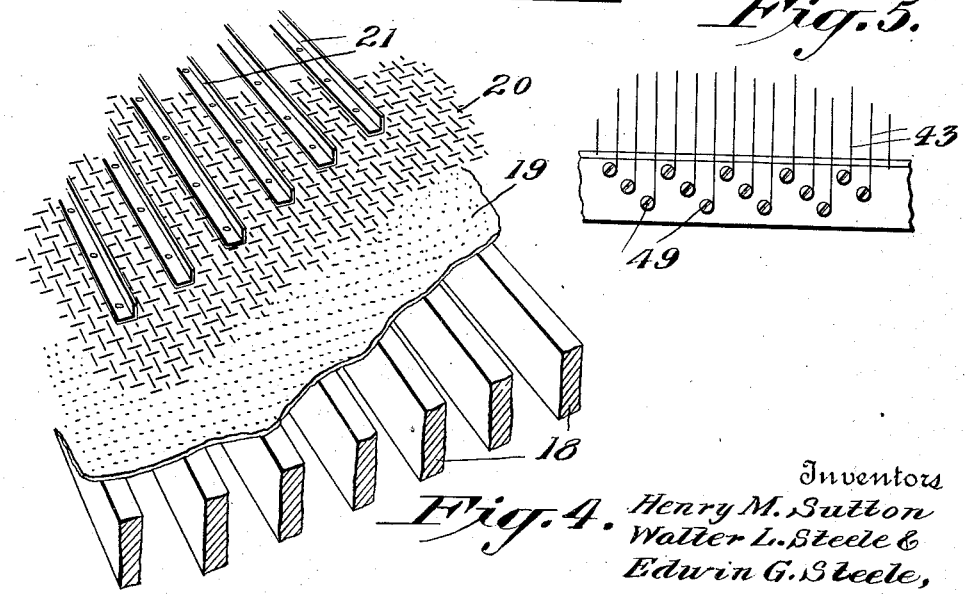
Fig. 5.
Fig. 4.
Inventors
Henry M. Sutton
Walter L. Steele &
Edwin G. Steele,
By
Attorney June 14, 1927.
H. M. SUTTON ET AL
PROCESS OF AND APPARATUS FOR SEPARATING, CLEANING, AND GRADING ALL KINDS OF NUTS, CEREALS, AND LEGUMES
Original Filed Dec. 13, 1919   7 Sheets-Sheet 3
1,632,520
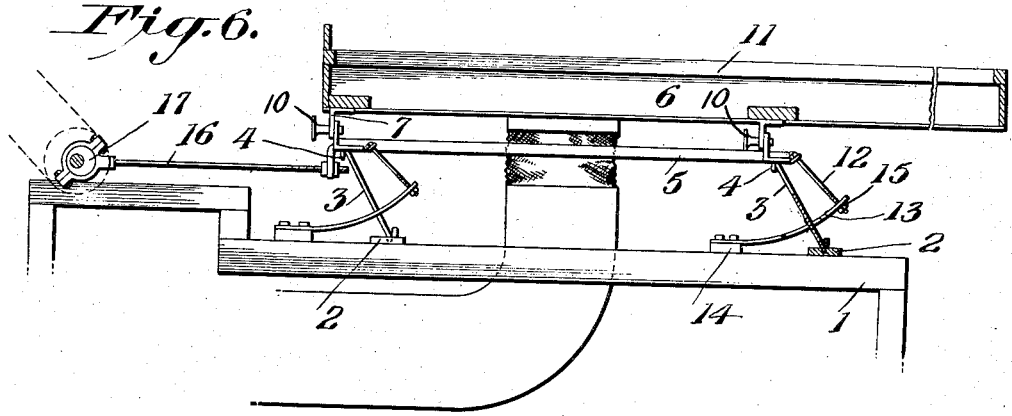
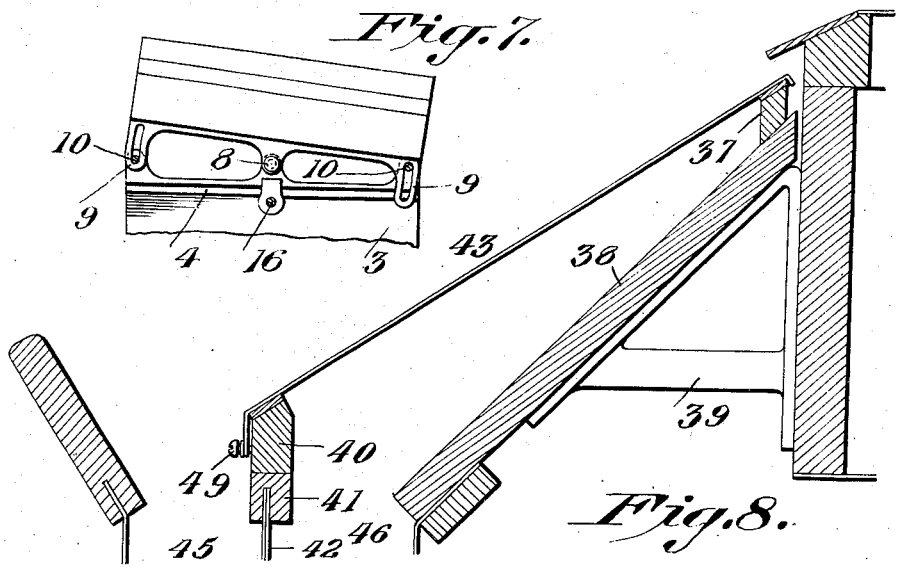
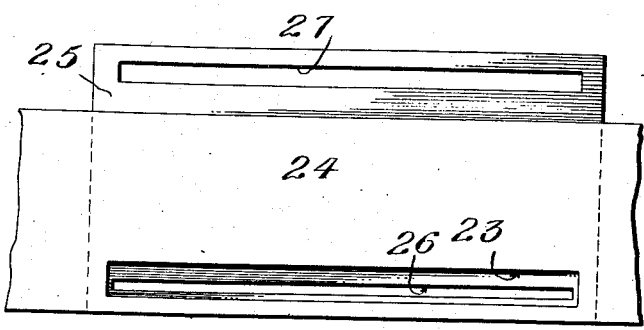
Inventors
Henry M. Sutton
Walter L. Steele &
Edwin G. Steele,
By
Attorney

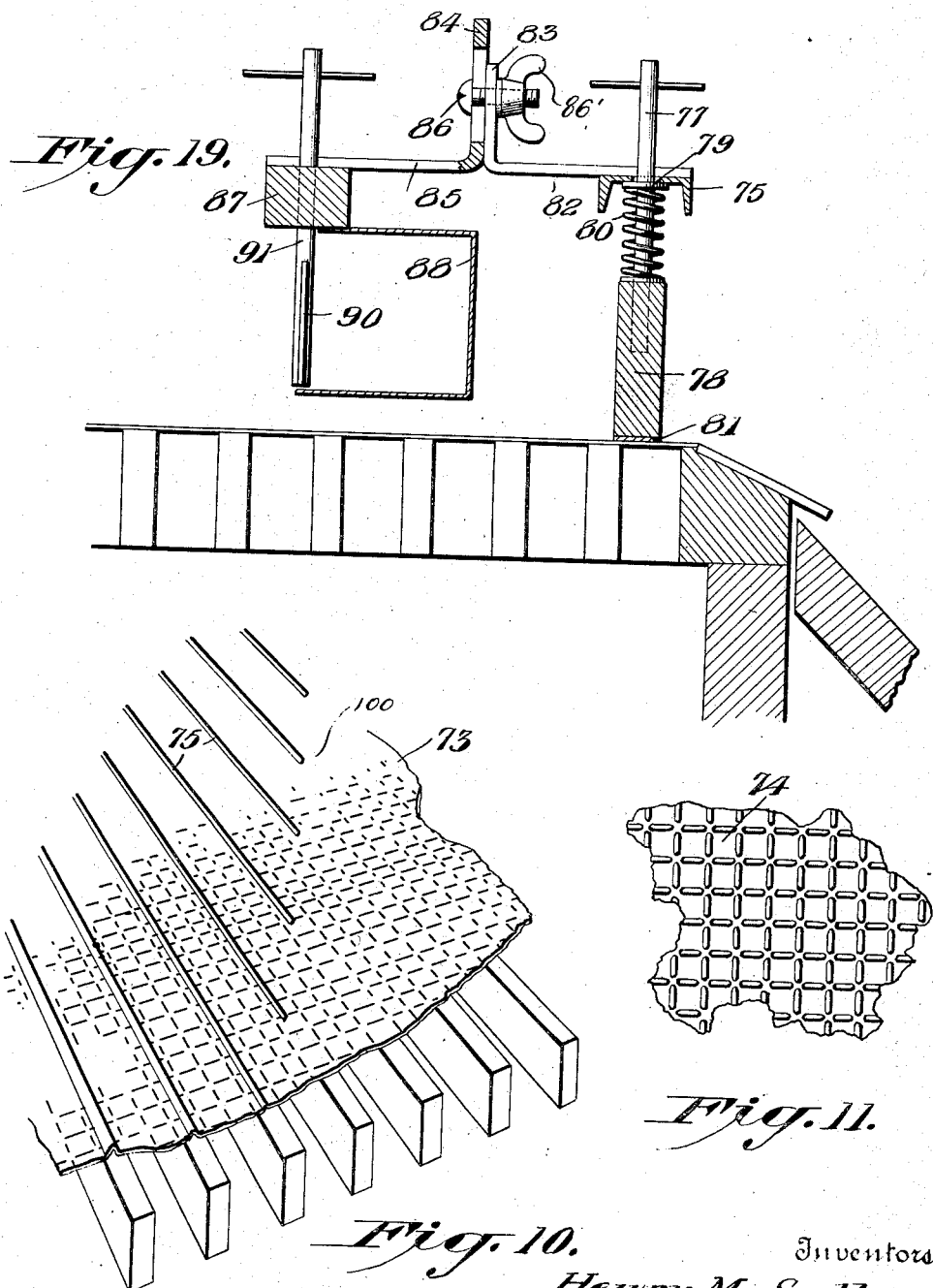

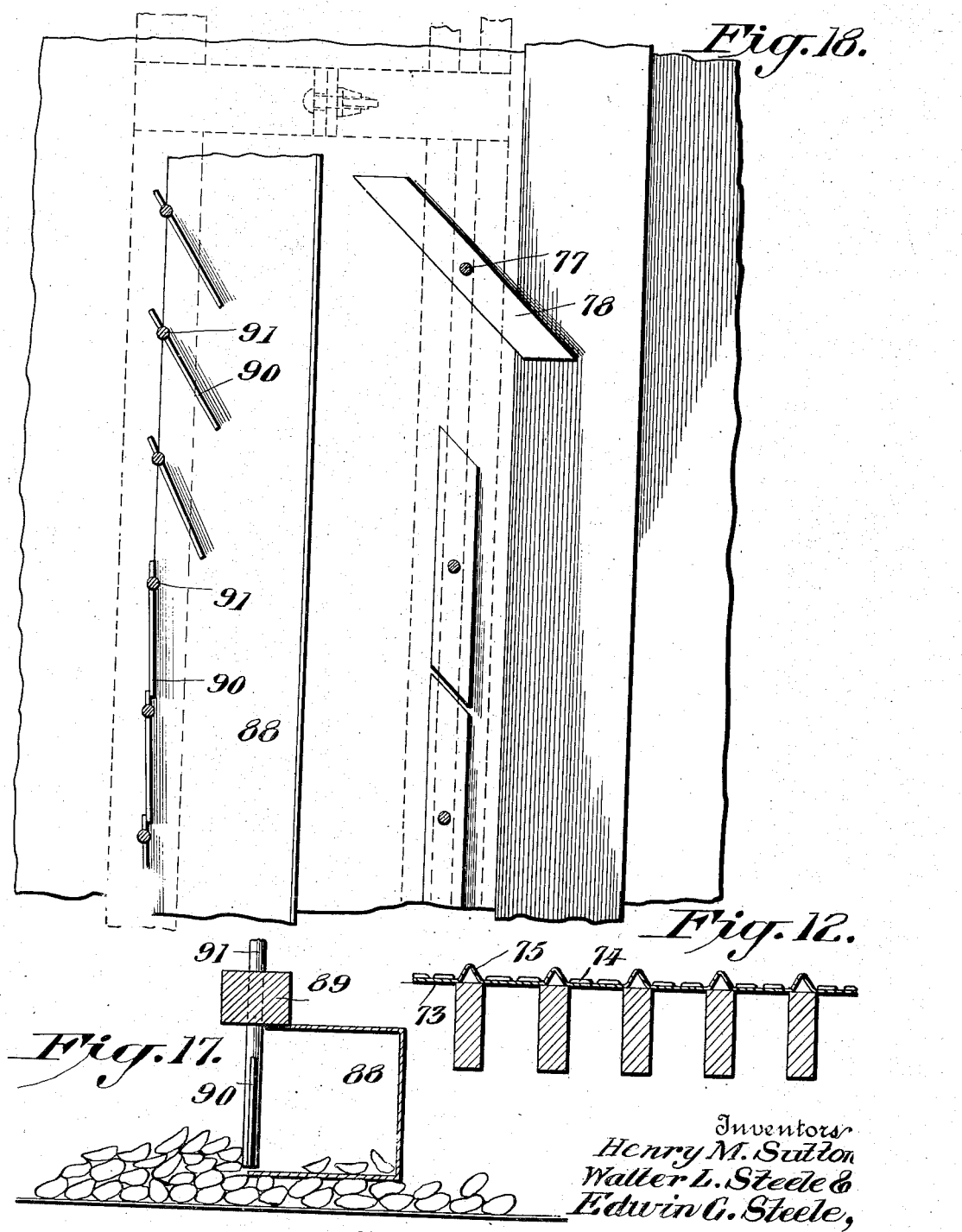

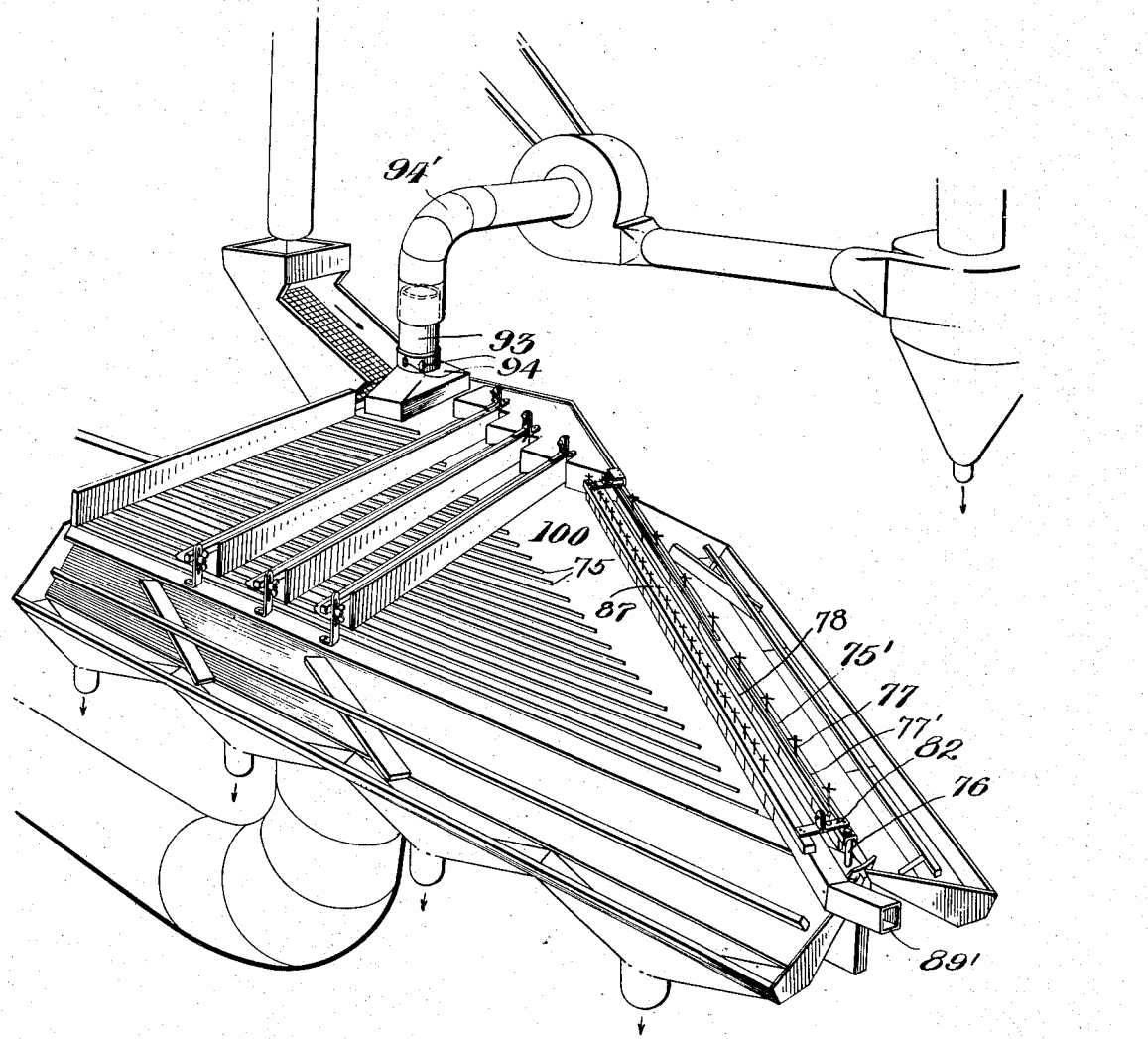

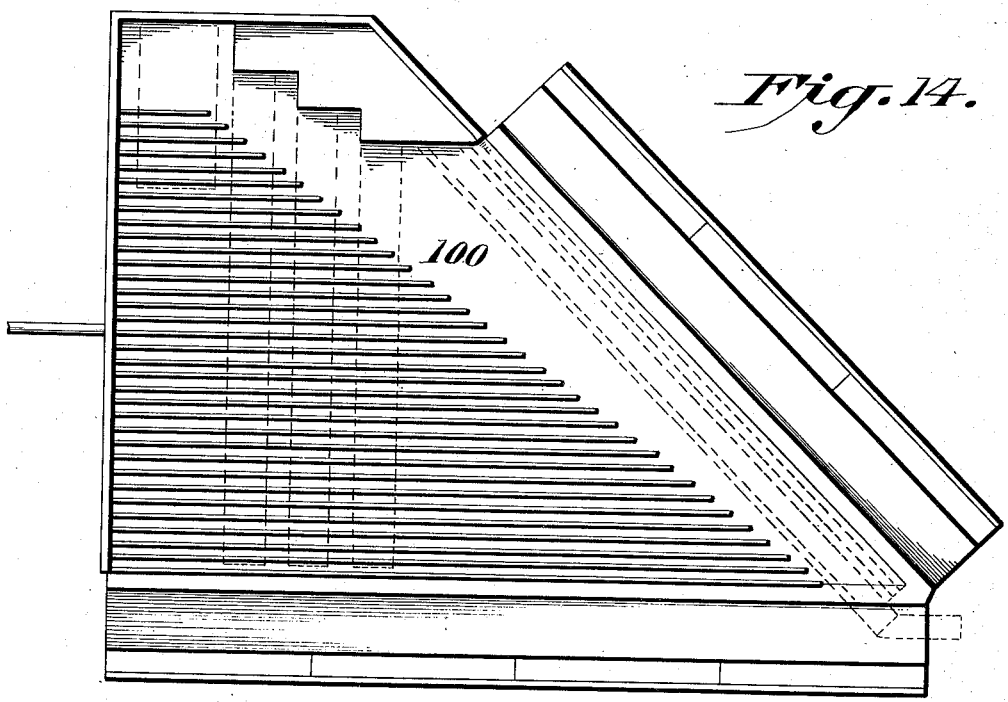
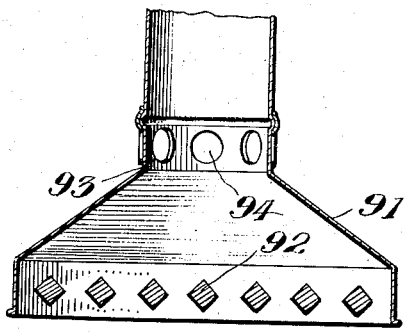
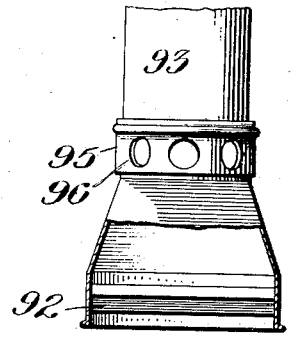

Patented June 14, 1927.

1,632,520

UNITED STATES PATENT OFFICE.

HENRY MOORE SUTTON, WALTER LIVINGSTON STEELE, AND EDWIN GOODWIN STEELE, OF DALLAS, TEXAS.

PROCESS OF AND APPARATUS FOR SEPARATING, CLEANING, AND GRADING ALL KINDS OF NUTS, CEREALS, AND LEGUMES.

Application filed December 13, 1919, Serial No. 344,583. Renewed September 15, 1926.

This invention relates to the process of and apparatus for separating, cleaning and grading all kinds of nuts, cereals, and legumes, and is an improvement on our United States Patents Nos. 797,239, dated August 15, 1905; 898,020, September 8, 1908, 979,046, September 10, 1910, 1,073,644, September 23, 1913, 1,133,760, March 30, 1915, and 1,315,881, September 9, 1919, the object being to improve the general construction of apparatus whereby the product from the huller can be completely separated on an apparatus constructed in accordance with our invention, thereby dispensing with a great number of machines now employed and the expensive method of hand-picking in order to produce a finished product.

Another object of the invention is to provide an apparatus having means for initially removing the smaller particles from the stock being treated before the same is submitted to the apparatus for treatment.

Another object of the invention is to remove the lightest constituents of the mass being treated initially at the beginning of the separating process.

A further object of the invention is to provide a roughened pervious floor which is pervious to air under pressure but impervious to the material upon it, whereby the table in its propelling or pushing action has a greater frictional value on the material whereby the material will respond more regularly to the action of the table.
Another object of the invention is to provide an improved construction of blowing baffle by means of which its action upon the lighter material of the deck is more definite and positive.
Another object of the invention is to provide on the feed side of the table, an air blast delivered at an angle to that which comes up through the floor of the table, to act upon the heavier zone of the material being treated at an angle to the same, whereby the lighter particles of material will be removed which are entangled with the mass.

Another object of the invention is to provide means for separating the whole from the split nuts during the process of separation, whereby they may be separately collected.

A still further object of the invention is to provide novel means for mounting an oscillating table, whereby lateral play and vibration is eliminated.

Prior to our invention, in separating and grading peanuts and the like, it was necessary to subject the nuts to the action of a number of machines and to finally hand-pick the product produced from the last machine in order to obtain the finished product. The main object of our improved apparatus and method is to provide a single machine whereby the nuts can be fed to the machine, separated, cleaned and graded, all in one operation.

Other and further objects and advantages of the invention will be hereinafter set forth and the novel features thereof defined by the appended claims.

In the drawings:

Fig. 2 is an enlarged transverse section through the banking block of the feed end of the table showing a gate controlled opening for delivering an air blast over the top of the zone of the heavier material to remove therefrom any lighter material that may be entangled therewith, said air blast being delivered at an angle of the travel of the material.

Fig. 3 is a transverse section of our improved form of blowing baffle bar whereby the repelling action of the air upon the lighter material of the stock being treated can be adjusted to suit the class of material on the table.

Fig. 4 is a detail perspective view partly broken away of our improved construction of deck showing the foraminous cover to increase the frictional value on the material being treated.

Fig. 5 is a detail view of the lower side of the apron screen showing the manner of mounting the screws for adjusting the tension of the wires of the screen.

Fig. 6 is a longitudinal vertical section through the apparatus showing the manner of mounting the air chest and deck for eliminating lateral play or vibration.

Fig. 7 is a detail end elevation showing the manner of mounting the air chest upon the supporting frame for obtaining lateral inclination of the deck.

Fig. 8 is an enlarged transverse section through the screen on the deck apron to separate whole nuts from half nuts.

Fig. 9 is a detail view showing the gate for controlling the air blast in the banking block.

Fig. 10 is a perspective view of a detail portion of the surface showing the preferred form of roughening the same by forming the same of sheet metal.

Fig. 11 is a top plan view of a portion of the deck surface, the perforations being omitted.

Fig. 12 is a section through the surface showing the manner of forming the same with the riffles.

Fig. 13 is a perspective view of a table especially adapted to be used for handling lima beans and the like.

Fig. 14 is a top plan view of the same.

Fig. 15 is a section through the preferred form of suction hood.

Fig. 16 is an elevation partly broken away.

Fig. 17 is a section through an adjustable banking and conveying bar.

Fig. 18 is a top plan view of a portion of the table showing the adjustable banking and conveyor bar and adjustable banking and cutting gates.

Fig. 19 is a section through the table showing the manner of supporting the adjustable banking and conveyor bar and the adjustable banking and cutting gates.

Figure 1:
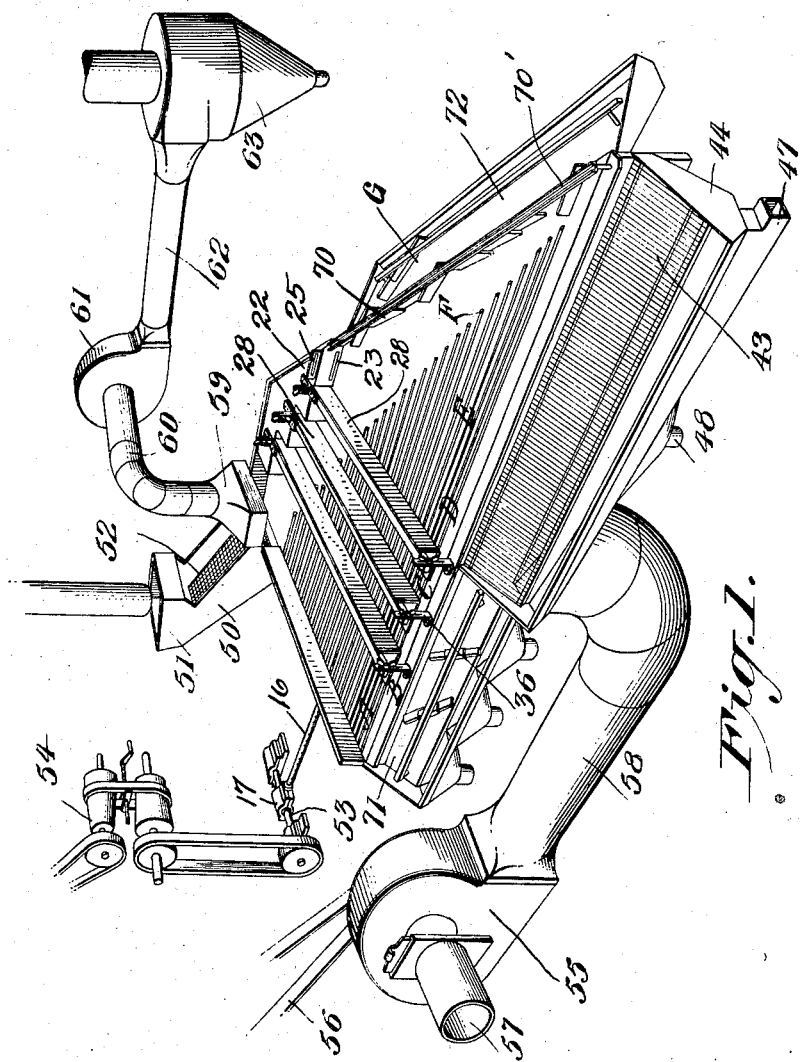
Fig. 1 is a perspective view of an apparatus for carrying out our improved process of cleaning, grading and separating all kinds of legumes, such as peanuts and the like, the construction shown being the preferred form for peanuts, peas, beans, etc.

In carrying out our invention, we employ a base frame 1, provided with sockets 2, adapted to receive the lower ends of inclined toggles 3, the upper ends of which are seated in similar sockets 4, carried by a supporting frame 5, as clearly shown in Fig. 6. Arranged above the supporting frame is a casing 6, forming an air chamber or chest which is mounted on a frame 7, pivotally mounted on the ends of the supporting frame 5, by a bolt 8, said frame having slotted lugs 9 through which extend hand wheels 10, for locking the frame 7 into adjusted position in respect to the supporting frame 5, whereby the lateral inclination of the deck 11 mounted on the casing 6 can be obtained. The frame 7 is mounted on the frame 5 at each end in this manner whereby the frame will be securely supported in such a manner that the inclination of the deck can be readily changed by loosening the hand-wheels and while we have shown this particular manner of adjusting the inclination of the table deck, of course it is understood that we do not wish to limit ourselves to these details of construction, as we are aware that various other means can be employed for accomplishing this result, but we have found the construction herein shown and described to be very satisfactory in use.

The inclined toggles 3 are firmly held in the sockets 2 and 4 by means of bolts 12, passing through the free ends of curved springs 13, which are mounted on suitable blocks 14, secured to the base frame 1, as clearly shown in Fig. 6. The bolts 12 pass loosely through the springs and have their lower ends threaded on which are mounted nuts 15, adapted to engage the springs 13 as clearly shown.

The toggles 3 are formed of any suitable material such as a casting and extend laterally under the table practically the full width of the upper and lower half of the base frame, it of course being understood that the lower base frame 1 is practically the same width of the toggle and that the toggle at the feed end of the table will be wider than the toggle at the opposite end as the table greatly decreases in width from the feed end to the opposite end as is clearly shown in the perspective view.

Referring to Fig. 1, it will be clearly seen that the cross-section of the table and air chest at the delivery point of the feed end of the table is greater than at the opposite end which as herein shown terminates practically in a point; consequently the toggle under the table at that end is wider than the toggle at the opposite end, this latter toggle being about what the width of the table would be at two-thirds of the distance from the feed to the delivery corner of the table.

In the various constructions of running gears shown in our prior patents, we have employed toggles arranged at the corners of the table as in our Patents Nos. 797,239, granted August 15, 1905, 898,020, September 8, 1908, and 979,146, September 10, 1910, the deck or table is supported upon the four inclined supports or toggles and we have found by experience that unless the table is very accurately mounted upon the support, considerable side play or lateral vibration soon becomes noticeable in the table and to overcome this difficulty, we dispense with the use of four toggles and use two by which in connection with the springs we are able to overcome the difficulties of our prior tables as the springs not only exert a pressure to retain the toggles in their sockets, but they also exert a pull on the pitman rod 16 of the eccentric 17, as by tightening the nuts of the bolts the table can be completely balanced so that the weight of the same is entirely relieved from the eccentric 17.

In the construction mentioned in our former patents, we have generally used coil springs which exert their pull in line with the reciprocation of the table; consequently when the table is rapidly oscillated there is a tendency for the table to jump or leave its support, the same being held in position simply by its own weight which produces a vibration detrimental to the efficient working of the same. The improved construction of spring as shown entirely prevents this jumping action by exerting a pressure downwardly on the toggle, and together with the increased width of the toggles over our former construction gives a perfectly smooth operation at any speed of operation of the table.

In the apparatus shown, we show an air chest and table deck constructed substantially in the same manner as that described in our Letters Patent No. 797,239, granted August 15, 1905, with the exception of the pervious deck surface, as we have substituted a foraminous sheet which we have found enables the table to be used to greater advantages in the separation of all kinds of nuts, cereals and legumes and granular agricultural products where separation can be made by the difference in specific gravity. As clearly described in our former patents, the surface of the deck is formed of porous textile material through which air is forced under pressure which is entirely satisfactory in use for the treatment of all kinds of mineral particles such as a mass of particles of ore pulp, small grass seeds, and cereals like wheat and oats, for instance, where the frictional value with the table is sufficient to enable them to respond readily to the propelling or pushing action.

In the treatment of peas, beans, peanuts and the like, owing to their size, and shape, the tendency on the smooth textile surface is not only to roll laterally across the table but to fail to respond readily to the pushing or propelling action of the table, these products having a tendency to remain in one spot and simply roll under the action of the reciprocation of the table.

In our former patents, to work effectually the table deck surface must carry a bed of the material being treated of considerable thickness in order that the stratification of the elements according to their specific gravity can take place where they are fed onto the table the depth of the bed should vary with the size of the particles of the mass, as in the case of peanuts, peas, beans and other legumes upon which the present apparatus is intended to operate. In products of this nature being operated upon an apparatus constructed with our present invention the bed varies in thickness near the feed from an inch to an inch and a half where the stratification takes places the heavier particles lying next to the surface and the next lighter above that and so on, the mass thinning out in the zone of separating material as it progresses more or less under the propelling action of the table.

In constructing the deck surface in accordance with the present invention as clearly shown in Fig. 4, which has been found to be effective in operation, we employ the usual form of spaced ribs 18, which extend longitudinally across the table in line with the reciprocation and over these is secured a sheet of finely perforated metal 19, the holes of which are sufficiently fine to offer sufficient resistance to the air passing therethrough that the same will be banked under pressure in the air chamber or chest 6. Secured over this perforated sheet of metal 19, in contact therewith is a sheet of foraminous material 20, such as wire cloth the size of the mesh of which should be approximately the size of the cereals, peas or beans being treated. The stamped perforated metal deck has the advantage of providing a number of pockets approximating the size of the nut product being treated, and prevents the pressure of the overlying strata from displacing the one in contact with the deck surface, while the propelling action of the table continues to displace them from one series of these pockets to another series approximating the line of reciprocation of the table, this line of movement will of course, be modified or changed into a more transverse movement under the action of gravity as the particles are heavier or lighter accordingly.

Secured on top of the foraminous material are a series of riffles 21, which extend parallel with the ribs 18 and are constructed substantially in the same manner as the riffles shown in our Patent No. 797,239 as they gradually decrease in height from the feed end toward the discharge end terminate on a line extending diagonally from the feed corner of the table to the opposite end leaving a blank or unriffled surface beyond the ends of the riffles. The foraminous material however extends over this blank or unriffled surface so that the material on the deck will be subjected to the propelling action of the table and the object of employing a wire cloth to form the deck surface is to provide a surface which will have sufficient frictional value to enable the stock of material being treated to respond to the differential action of the table and to keep particles of the stock from rolling and we are aware that any kind of a roughened surface placed upon the deck will accomplish the desired result and therefore we do not wish to be limited to the use of any particular kind of material.

In connection with a table as constructed as previously described, we employ means for delivering an air blast at an angle to the air blast which comes up through the deck surface at a point on the feed side of the table where it will act to remove from the heavier constituents of the stock being treated any lighter material that may be entangled therewith, the air blast being so arranged that it extends at an angle to the travel of such material on the apparatus. To accomplish the above result, one of the banking blocks of the series of banking blocks located at the feed side of the table is formed hollow to produce an air chamber 22, which preferably extends under the block over the entire section of the table occupied by it and is provided with an outlet opening 23, as clearly shown in Fig. 2 of the drawings. The top of the block is provided with a slot 24, in which is slidably mounted a reversible gate 25, having openings 26 and 27 at its opposite ends of different sizes, these openings being in the form of slots whereby the gate can be reversed in order to increase or decrease the air blast delivered through the discharge opening 23. In constructing the banking block to accomplish the above result, it is essential that a pressure of air be maintained in the air chamber 22 thereof, whereby the banking block must cover a sufficient area of the table to enable the intake of air from the air chest 6, to be greater than the outlet opening 23, whereby a jet of air of the proper velocity can be directed against the product desired to be operated on.

In our Patent No. 1,133,760, granted March 30, 1915, we employed a series of baffle bars extending transversely across the table and we have improved the construction of these baffle bars by providing means for regulating and adjusting the action of the same for eliminating during the initial stage of the separating process light sticks, small sections of the tap roots of the plant nubbings or small unshelled nuts as the pressure which these bars exerted on the stock which is suspended or floated in the air which forms a cushion for the stock being treated causing them to more rapidly form into zones of separated materials. This pressure is brought about by the baffle bar exerting an air pressure toward the rear end of the table which amounts to a repelling action upon the lighter material mentioned, while the table is exerting its pushing action in the reverse direction on the heavier constituents lying in proximity or in contact with the deck surface.

In Fig. 3, we have shown our improved construction of baffle which comprises a supporting bar 28 having a plate 29 connected thereto which is bent back as shown and has its opposite end connected to the support, the ends being closed in order to produce an air chamber 30. The top of the baffle bar is provided with a series of openings 31 adapted to be closed by gates 32 sliding loosely under straps 33 as clearly shown whereby the size of the openings 31 can be increased or decreased as will be later described. The under side of the plate 29 forming an air chamber is provided with a plurality of openings 34 in the form of perforations of the desired size which will admit air to the chamber 30. From the above construction it will be readily seen that when the gates 32 are entirely open practically all of the air which collects on the under side of the baffle bar passes through it without exerting an appreciable rearward pressure or repelling action of the lighter constituents of the mass, but with the gates closed the maximum air pressure of the bar is so exerted and by regulating the openings 31 any desired pressure of the bar on the material being treated can be maintained. These openings can be so arranged and adjusted that one part of the bar will exert a different pressure from another portion of the bar.

The support 28 of the bar extends down below the bar proper or air chamber forming a tip 35, which extends into the bed of the stock on the deck surface and performs two functions. It has a skimming action and removes what material may float on the top of the heavier constituents below and it increases the resistance of the air in the direction of the heavier product. Therefore the air finds less resistance for exit under the bar in the direction of the rear of the deck and exerts a pressure on the lighter constituents of the stock being treated. This bar can be adjustably mounted as shown in our Letters Patent No. 1,133,760, previously referred to.

The bars are arranged transversely of the deck as clearly shown in Fig. 1 preferably parallel with one another and are adjustably mounted in relation to the deck surface by means of uprights 36 having slotted portions through which bolts carried by the bars are adapted to pass provided with wing nuts for locking the bars in their adjusted position with respect to the deck and while we have shown three of these bars adjustably mounted from the bank, it is of course understood that we do not wish to be limited to the use of any particular number of bars as the number of bars can be increased or decreased as desired without departing from the spirit of our invention.

In separating the peanuts or other nuts of similar nature in order to produce a finished product it is essential to provide means for removing the half nuts from the whole nuts during the process of separation and to accomplish this result we employ a specially constructed screen formed of wire stretched taut across two opposite supports which is clearly shown in Fig. 8 of the drawings. A support 37 is secured to the apron 38 at the upper side, the apron board being fastened to a bracket 39, which is secured to the air casing or chest. The opposite support 40 rests upon a supporting member 41 and is secured to a partition 42. Over these supports 37 and 40 are stretched a plurality of wires 43 forming a screen which is arranged inside of a casing 44, which is provided with two compartments 45 and 46, formed by the partition 42, the compartment 45 being provided with a delivery spout 47 and the compartment 46 being provided with the discharge spout 48, the whole nuts passing out through the discharge spout 47 and the half nuts through the discharge spout 48. The particular manner of constructing the screen is not essential but as shown in Figs. 5 and 8, we preferably employ piano wire of relatively small diameter. One end of each wire is rigidly attached to the support 37 and spaced therefrom by grooves or soldered thereto at regular spaced intervals as desired, and the other end of each wire passes over a similar strip carried by the support 40, which is grooved to receive the wires and the grooves of these strips are preferably only formed half the depth of the diameter of the wires and are equally spaced apart. The ends of the wires 43 pass around screws 49, as shown in Fig. 5 and by turning the screws the tension of the wires can be increased or decreased and as previously stated we do not wish to confine ourselves to the particular manner of forming a screen as the main object is to provide a screen formed of a plurality of parallelly arranged wires having means for increasing or decreasing the tension of the wires for obtaining the desired result in order to produce a screen whereby the blinding of the same is prevented. In the ordinary construction of screens having cross-wires or meshes which constitute a sieve, nuts, etc. almost small enough to go through, lodge against the wires and soon the entire screen is blinded while in our invention the screen being attached to the table and vibrating with it the wires of the same are kept in constant state of vibration which acts to slightly repel the larger nuts, etc., from the surface and as no cross wires are employed to present obstructions the flow of the material over the same is divided, part of the material going over the screen and the smaller particles passing through.

Arranged at the feed end of the table is a screen 50 which is rigidly attached to the table and oscillates therewith and is provided with a hopper 51, and a suitable space being arranged under the screen or pocket 52 thereof not shown, to receive such products as may pass through its mesh having an opening to permit the exit of such material therefrom into suitable receptacles or the same can be conveyed from the machine by the usual form of conveyors employed for this purpose. The material is fed first to the screen where the fine particles are separated from the nuts and the like and the nuts or product being operated upon is delivered onto the table deck.

The eccentric 17 is mounted on the shaft 53 carrying a pulley over which extends a belt from the change speed mechanism 54, by means of which the table is reciprocated in such a manner that the speed of reciprocation can be increased or decreased and while we have shown a particular form of change speed mechanism we do not wish to limit ourselves to any particular form of change speed mechanism.

Disposed to the rear of the table is a fan housing 55 in which is mounted a suitable fan not shown driven by a belt 56, said housing being provided with a gate controlled air inlet 57, and an outlet pipe 58, which extends under the table and is connected to the air chamber or chest by a flexible pipe not shown which is the ordinary manner of maintaining the uniform upward pressure of air through the pervious surface of the deck.

In order to provide means for initially removing the lighter particles of the material fed onto the deck therefrom, we provide a suction hood 59, connected by a pipe 60, to a fan 61, which is driven by any suitable driving means from the source of power, the fan 61 being connected by a pipe 62, and a dust collector 63 of the ordinary commercial construction now in use.

In the operation of an apparatus for carrying out our method of separating material as specified, supposing the product to be a legume such as peanuts, which have passed through a huller. Peanuts are mixed with the hulls from which they have been freed, together with small bits of peanut vine small bits of the root, stones and clods of dirt as large as the peanut and smaller. This product is delivered to the screening surface of the screen 50 through the ordinary delivery spout as shown and the screen under the oscillation action of the table removes all foreign material smaller than peanuts, leaving a regular size product to be delivered to the table. As the material reaches the table deck, it is acted upon by the upward pressure of air from the air chest which provides an air cushion over the entire deck surface such as for instance as is described in our Patents Nos. 797,239 and 1,133,760, and the product to be separated when delivered from the screen surface to the feed corner of the table first forms into strata, the heavier products such as for instance, the rocks and clods of dirt occupying the stratum next to the table deck surface, the heavier nuts but lighter than the rocks occupying the next stratum, and the unshelled peanuts called nubbings the next, the short sticks the next and the top of all the shells and husks.

At this stage of the separation we suck the shells and hulls off of the table which on account of their bulk and lightness can be disposed at once, so as to avoid incumbering the table with this product which enables the table to treat a larger volume of nut products. For this purpose we provide a suction hood connected by a pipe, with a fan which is driven from any suitable source of power, the fan being connected by a pipe with a dust collector and the lighter material passes through the fan and is delivered to the dust collector, the lighter material dropping out through the bottom into a suitable receptacle while the air and fine dust goes out of the top and can be conveyed to a bag house and the dust caught if desired.

The table constructed in accordance with our invention being arranged laterally inclined from the feed end, the strata of the different material under the projecting pulsations of the table longitudinally by the action of the eccentric causes these strata to emerge from under one another, the lighter material obeying the force of gravity more than the thrust of the table travels laterally across the table and inasmuch as the heavier material lying closely to the deck surface, respond more to the pushing action of the table and the intermediate products in the same way in proportion to their specific gravity so that a compromise in the movement of the different particles occurs in the shape of zones of separated material up on the table.

We have the lighter material represented by A as sticks and light shells, the next heavier material represented by B, which is the small unshelled peanuts, the next by C, which is a middling product and is the parting zone of separation between the nubbings, small split nuts and small shelled whole nuts. This product is usually returned to the feed for re-treatment.

The next heavier product is represented by D which consists of the large split nuts associated with the smaller whole nuts of the same weight. The next heavier product is represented by E containing still heavier grades of nuts and some of the larger split nuts, but the whole nuts predominating, being a better and heavier grade than D. The zone indicated by F is still a heavier product than E, and contains only the very largest whole nuts and the heaviest product of all is designated by the letter G and consists of rocks, clods of dirt which is only a short zone, as this product hugs closely around the banking block and reports between this point and the first of the gates. Now it is at this point in the separation we have added the important improvement of an air blast delivered at an angle to that which comes up through the table and also at an angle upon the material traveling upon the deck surface.

When there are several zones formed on the table as described, and if for any reason the product forming the heaviest zone becomes absent in the stock fed to the table, then the next heaviest zone advances upward on the table and occupies its place. Now in treating a legume product such as peanuts, it often happens that the rock and dirt of the product may not be present in sufficient volume to form a separate zone, in which case the next heavier product, which in this case would be the whole nut product, would occupy the intervening spaces between the rocks or dirt and intermingling therewith, but nevertheless this rock and dirt product hugs closely to the banking lock as described. Now to prevent some of the nuts intermingling with this product where it reports between the upper gate and the banking block, we provide the air blast delivered through the banking block through a slotted opening in a sliding gate having a predetermined width of opening to suit the conditions required. This blast of air it will be noted is not delivered on a level with the deck but at a slight distance above the same, being about the distance above the deck as would approximate about half of the diameter of the nut product being treated, although this distance is not absolutely essential. This blast of air is so regulated by the width of slot opening in the gate that it has just sufficient force to blow aside the nut product, but not sufficient to disturb the rocks and clods of dirt, therefore enabling this product to be obtained free of nuts.

Now we show a number of gates 70 held under a railing 70'. These gates are held in place by friction, perferably, in the manner shown in our Patent No. 1,315,881, and when these gates are closed, they may be used as a banking strip as is described and claimed in our Patent No. 1,073,644, and a layer of concentrated material formed and released through the various gates as desired, which in this instance would consists of the very largest and most perfect nuts useful for fancy candy stock.

Now when the materials from the zones D, E and F are delivered to the screen 43, division is here made between the half nuts and the whole ones, the half nuts passing between the wires composing the screen and reporting through the spout opening 48, while the whole nuts report through the spout 47.

It will now be seen from the above description that we have provided an apparatus for efficiently separating, cleaning and grading legumes, such as peanuts and the like.

In the present invention the legumes received from the hullers are cleaned of all foreign material, graded accurately as to weight and size and the splits separated from the whole legumes, thereby performing a work that has heretofore, in the prior art, required a number of separate operations, which have performed this work so imperfectly that hand picking of the stock had to be resorted to to finish the cleaning and grading, requiring a number of attendants for the purpose, while in our machine but one operator is required, who can attend to a number of machines, if necessary.

While we have designed this machine in a preferred form for cleaning peanuts, it is applicable not only to any legume, but to the cleaning of various agricultural products having a granular mass of particles which differ in specific gravity. It is also applicable to the separation of coarsely ground mineral substances, such as coal, removing therefrom the slate, bone and sulphur impurities, etc., and we, therefore, do not wish to limit our invention to any one class of material.

The table is provided with a delivery shelf or apron 71, having a series of guide fingers arranged under a rail as clearly shown in our former patents. The opposite side of the table is provided with a delivery shelf 72, constructed in substantially the same manner and these delivery shelves are preferably provided with troughs having spouts so that the various graded materials can be separately collected.

From the foregoing description it will be seen that we have provided an apparatus for separating and grading seeds and the like which is provided with means for first removing foreign particles of a smaller diameter than the particles being treated, then delivering the mass of the particles onto a roughened surface so as to support the mass by gaseous cushioning medium to permit stratification thereof, then drawing off the lighter particles of the stratified mass. The mass is then propelled on the inclined roughened surface of the deck and is subjected to a repelling action so as to retard the lighter particles of the mass, the heavier particles of the mass passing under the retarding means and are subjected to an air blast so as to remove any light particles which have become entangled with the heavier particles and the nuts are then delivered from the table onto a screen for separating the whole from the split nuts, it of course being understood that the mass of material traveling on the table is acted upon in substantially the same manner as clearly set forth in our prior patents.

In Figs. 10, 11 and 12 we show a pervious raised deck constructed in accordance with our invention composed of a sheet of metal 73 having upset perforations to form a plurality of pockets 74 and riffles 75 by means of which the same can be readily attached or detached from the supporting rib and it is of course understood that these riffles gradually decrease in height and terminate on a line extending diagonally across the table. By this construction we are able to form a roughened surface of a single sheet of metal by placing the same in a suitable die so that the roughened surface as well as the riffles are formed in one operation. In order to form the necessary resistance to the gravital movement of the material transversely across the table it is necessary that the riffles be impervious to the air coming through the table deck and by forming the riffles so that when the surface is placed in position the riffles will rest on the ribs of the deck the ribs act to cut off the air and renders the riffles impervious. The main advantage accomplished by constructing a roughened surface in this manner is that the riffles so so stiffen the perforated sheet metal surface that the same can be attached to the supporting ribs at fewer places which enables the ready removal of the metal surface for cleaning and repairing and we are able to manufacture the same very cheaply.

In Fig. 13 we show a table constructed substantially in the same manner as shown in Fig. 1 with the exception that the gates 70 are removed and a construction of banking and conveyor bar is substituted therefor which is especially adapted to be used in handling legumes such as lima beans and the like. Arranged along the edge of the table is a slotted gate bar 75', one end of which is mounted on the adjacent banking block and the other end supported by a post 76. Extending through the slot of the gate bar 75 are the stems 77 of gates 78 which are preferably provided with bevelled ends as clearly shown in Fig. 18, this gate being capable of being moved longitudinally along in the slot of the bar or turned as shown. The stem of each gate carries a washer 79 against which the upper end of a coil spring 80 bears, the lower end resting on a washer arranged on the top of the gate which provides frictional means for holding the gates in their adjusted positions. The bottom of each gate is preferably form formed with a packing 81 such as a strip of felt or lamp wick for the purpose of sealing the bottom of the gate where it makes contact with the table deck. Secured on top of the gate bar 75 at each end is a strap 82 which is provided with an angled apertured end 83 against which is arranged the slotted angled end 84 of the strap 85. A suitable bolt 86 extends through the angled ends 83 and 84 of the straps 82 and 85 which carries a wing nut 86' for adjusting the position of the strap 85 in respect to the strap 82 for the purpose hereinafter fully described. The free ends of the straps 82 are secured to a supporting bar 87 which carries a trough-like conveyor receptacle 88 preferably rectangular in cross section having a discharge spout 89' at one end as clearly shown in Fig. 13. The trough-like conveyor 88 is provided with an open side closed by a plurality of gates 90 carried by stems 91 slidably and revolubly mounted in suitable openings formed in the supporting bar 87 whereby the gates can be turned or adjusted to various positions so as to completely close the open sides of the conveyor receptacle or they can be moved to present a solid baffle to the material impinging against them as it will be noted that the gates are so mounted in the stem that a short extension is provided at one side of the stem which overlaps the adjacent gate as clearly shown in Fig. 18. The gates can be lifted upwardly so as to admit the split nut through slot openings formed by the bottom of the gate into the conveyor receptacle. By the adjustment and manner of mounting the gates as shown the conveyor and gates can be raised and lowered in respect to the deck surface and the material thereon.

In the separation of the legumes such as lima beans and the like on account of their flat cross section relative to their length and width it is impossible to separate the splits from the whole efficiently by screening the same as there are frequently in the stock split beans which have practically the same cross section as the whole ones. We have observed in treating this kind of stock on a table constructed according to our invention that these split beans on account of their being of the same area float boat-like on the top of the mass, the flat side being invariably up and as there is not enough of them to form a separate stratum, the object of constructing a table with the banking and conveying bar is to provide means for banking these splits into a separate zone on top of the lower stratum of whole beans and to then collect them through separate gate openings into a conveying chamber located in a conveyor bar, all openings between the gates being so proportioned that a bank of these splits is maintained along more or less the length of the conveyor bar. These splits are cut through the gate a little at a time so as to maintain this zone until practically all the splits are collected in a separate chamber and discharged through a separate spout. In Fig. 17 we show a section of the banking and conveying bar arranged over a deck showing the manner of separating the splits from the whole beans and as the same is capable of being raised and lowered in respect to the deck surface it can be adjusted to suit various conditions. The material passing under the banking and conveying bar is handled by the gates 78 and as these gates are capable of being lifted or turned on their axis the operator can obtain any desired discharge opening to suit the class of material being treated and as the ends of the gates are beveled when they are shut they form an unbroken obstruction to the material impinging against them. From the above description it will be seen that a table constructed in accordance with our invention can be changed by substituting various constructions of gates and banking bars to meet the requirements of the material being treated.

In Figs. 15 and 16 we show the preferred form of aspirator or suction hood and while in Fig. 1 we have only shown a plain hood without means for adjusting the same it is of course understood that a hood constructed as shown in Figs. 15 and 16 as applied in Fig. 13 can be used in connection with a table as shown in Fig. 1 and therefore we do not wish to limit ourselves to any particular construction of suction hood although we have found that a suction hood constructed as clearly shown obtains better results than with previous constructions of hoods now in use.

In constructing a hood as shown in Figs. 15 and 16 the hood proper 91 is subdivided into a number of inlets by substantially diamond shaped spaces 92 for the purpose of offering a certain amount of resistance to the intake of air as without these the velocity of air would be greater opposite the center of the suction pipe. For instance in the center between each one of the diamond spaces the air is moving at a slightly greater velocity than at the edges of the spaces. This is due to the friction of air against these elements producing a retardation of air velocity and while it is not claimed that this construction absolutely equalizes the intake air pressure over the entire lower surface of the hood it does distribute the air lift into numerous centers of greater suction.

The hood is provided with a neck portion 93 having a series of openings 94 over which is arranged a collar 95 provided with openings 96 adapted to register with the openings 94 forming a shutter and by rotating the collar the openings can be opened or closed to any extent desired whereby the suction from the fan is modified to suit various conditions. The neck portion 93 extends up into the suction pipe 94' and is preferably provided with means for holding the same in adjustable position so that the position of the suction hood in respect to the table deck can be quickly adjusted. We are aware that we are not the first in the art to use an aspirator in connection with various screening and separating devices as it has been very common to locate an aspirator over some form of screen through which air is blown while at the same time air is sucked from the opposite side and these types of machines separate the particle under treatment by the difference in specific gravity and can only treat such particles which show a decided difference in this respect. We have found that for an aspirator device to be efficient upon particles of the class described it must suck from a pervious surface under which air must be banked at considerable pressure simply allowing the air to filter through forming an air cushion of absolutely equal density such as is supplied from a deck surface. This floats the lighter products to the top on an even stratum and with a suction device constructed as disclosed in our application these products are subjected to an approximately even lifting force of air that removes in the area of influence exerted by the aspirator these lighter products. We have constructed the suction hood or aspirator in the manner above described to meet conditions of the pea and bean product that grow in the central west and extreme western States or any place where the soil consists of a volcanic silt whose particles are held together by clay or other binder, as this material has very nearly the same specific gravity as the pea or bean and becomes intermingled during the harvesting, cleaning and grading.

The operation of an aspirator constructed in accordance with our invention and used on a table operating upon seeds, cereal and legume products containing the above mentioned material is as follows:—When the feed reaches the table stratification takes place and the silt clod material floats on the top of the pea or bean product but owing to the frictional value it maintains with this product it will not move transversely across the table under the influence of gravity. The suction hood under these conditions is then lowered until it almost touches the bed of material on the table and collects all these silt clods first into relative dense stratum within the area covered by the hood then between each one of the spaces where there is a slightly increased air suction these clods accumulate in mass and leave the surface of the material and are sucked up into the suction hood and conveyed by the air to the desired point. We have found by experimenting that to have an aspirator work successfully the material must be stratified on an air cushion or film of equal density and exerting the suction against the top stratum only as by this means the upper stratum protects the lower one from the suction action of the aspirator and this method of removing the upper stratum is not known in the prior art, as in the prior art devices of this kind exert their suction force against the entire mass indiscriminately.

From the foregoing description it will be seen that we have provided a method and apparatus of separating all kinds of material and one which is especially adapted to be used for separating seeds, cereals and the like whereby the material to be separated is fed onto a pervious surface and is acted on in such a manner as to thoroughly separate the material and while we have shown in the drawings several forms of apparatus for carrying out our method and the particular construction of this apparatus we do not wish to limit ourselves to the details of construction shown as we are aware that various changes can be made without departing from the spirit of our invention.

While in the drawing and description we have illustrated and described an apparatus and process which is especially adapted to be used for seeds, cereals, nuts, etc., the construction of apparatus and the process is capable of separating coal, ores, etc., and therefore we do not wish to limit ourselves to the separation of any particular kind of cereals or material.

What we claim is:

1. The process of separating and grading a mass of material consisting in feeding and supporting a mass upon a transversely inclined surface by a gaseous cushioning medium to permit stratification thereof, lifting the lighter particles of the mass stratified at the point of feed by a suction action, propelling the mass upon said surface, retarding the mass in its propelling movement and separately collecting the separated material.

2. The process of separating and grading a mass of nuts or the like consisting in gravitally feeding the mass of nuts and supporting the same upon a transversely inclined surface by gaseous cushioning medium to permit stratification thereof, removing the lighter particles of the mass stratified at the point of feed, propelling the mass upon said surface, retarding the mass in its propelling movement, and separately collecting the separated nuts.

3. The process of separating a mass of nuts or the like having different characteristics consisting in feeding the mass and supporting the same upon a transversely inclined surface by gaseous cushioning means to permit stratification thereof, removing the lighter particles of the mass stratified, imparting to the mass a positive movement, subjecting the heavier zone of the mass to an air blast to remove the lighter particles entangled therewith and separately collecting the separated nuts.

4. The process of separating a mass of nuts or the like consisting in supporting the same upon an inclined surface by a gaseous cushioning medium to permit stratification thereof, imparting to said mass a positive movement across its path of travel by gravity, repelling the substantially lighter particles of the mass, subjecting the heavier zone of particles to an air blast delivered at an angle to the path of travel of the material for removing the lighter particles therefrom and separately collecting the thus separated nuts.

5. The process of separating and grading a mass of nuts or the like, consisting in supporting the mass upon an inclined support by a gaseous medium to permit stratification thereof, removing the lighter particles of the mass stratified, imparting to said mass a positive movement across its path of travel by gravity, repelling the lighter particles of the mass across the direction of the propelling movement, subjecting the heavier zone of particles to an air blast for removing the lighter particles entangled therewith, and separately collecting the thus separated nuts.

6. The process for separating and grading nuts and the like, consisting in feeding and supporting the progressively narrowing stream of the mass of nuts upon a transversely inclined surface by continuous air pressure to cause a gravital transverse movement of said material upon said support and to permit stratification thereof, removing the lighter particles of the stratified mass at the point of feed, imparting to said mass a positive movement across the path of travel by gravity, repelling the movement of the lighter particles of the mass across the direction of the propelling movement, subjecting the heavier zone of particles to an air blast and separately collecting the thus separated nuts.

7. The process of separating and grading a mass of nuts and the like, consisting in first removing the smaller particles of the mass, feeding the mass upon a roughened surface, and supporting the same thereon by a gaseous cushioning medium to permit stratification thereof, imparting to said mass, a propelling movement, repelling the movement of the lighter nuts of the mass across the direction of the propelling movement, subjecting the heavier zone of nuts to an air blast delivered at an angle to the movement of the particles for removing the lighter particles entangled therewith and finally separating the whole from the split nuts.

8. The process of separating and grading a mass of nuts or the like, consisting in feeding the mass of nuts and supporting the same upon a transversely inclined pervious floor gradually decreasing in width from the feed end toward the opposite end, subjecting said mass to a uniform upward pressure of air to permit stratification thereof, removing the lighter particles of the mass thus stratified at the point of feed, repelling the lighter particles of the mass, subjecting the heavier zone of the mass to an air blast and separately collecting the thus separated nuts or the like.

9. The process of separating and grading a mass of nuts or the like, consisting in feeding the mass and supporting the same upon a transversely inclined surface gradually decreasing in width from the feed end toward the opposite end thereof, supporting said mass by a gaseous cushioning medium to permit stratification thereof to cause a progressively narrowing stream to move longitudinally thereon, imparting to said mass a propelling movement, repelling the movement of the lighter nuts of the mass across the direction of the propelling movement, subjecting the heavier zone of nuts to an air blast for removing the lighter particles entangled therewith, and separately collecting the thus separated and graded nuts or the like.

10. The process of separating and grading nuts or the like consisting in supporting the mass upon an inclined support by gaseous cushioning medium to permit stratification thereof, imparting to said mass a positive movement across its path of travel by gravity, repelling the substantially lighter particles of said mass in the direction opposite to the imparted movement of said particles, subjecting the heavier zone of particles to an air blast for removing the lighter particles entangled therewith, and separately collecting the whole from the split nuts.

11. The process of separating and grading a mass of material having different characteristics, consisting in feeding the material and supporting the same upon a transversely inclined surface by a gaseous cushioning medium to permit stratification thereof, to cause the progressively narrowing stream of material to move longitudinally thereon, imparting to said mass a propelling movement across the feeding movement of material, repelling the lighter particles of the mass across the direction of the propelling movement, subjecting the zone of heavier particles to an air blast at an angle to the propelling movement and separately collecting the thus separated particles of the mass.

12. An apparatus of the kind described having a transversely inclined roughened pervious floor gradually decreasing in width from the feed end toward the opposite end thereof, means for subjecting the material to a gaseous cushioning medium to permit stratification thereof, means for removing the lighter particles from the mass, and means for separating the whole nuts from the half nuts.

13. An apparatus for separating and grading nuts and the like comprising a table having a transversely inclined roughened pervious floor, gradually decreasing in width from the feed end toward the opposite end thereof, means for subjecting the material to a gaseous cushioning medium to permit stratification thereof, means for feeding the material, means for propelling the material longitudinally thereon, means for repelling the lighter particles of the mass, means for separating the lighter particles of the mass from the heavier particles and means for separating the whole nuts from the split nuts of the mass delivered from said surface.

14. The process of separating and grading nuts or the like consisting in first removing the smaller particles of the mass, feeding said mass and subjecting the same to a gaseous cushioning medium, upon a transversely inclined roughened surface gradually decreasing in width from the feed end toward the opposite end thereof to permit stratification of the material thereon, removing the latter particles from the stratified mass at the point of feed, propelling the mass of material in the direction cross the movement of the material by gravity, repelling the movement of the lighter material in its propelling movement, subjecting the heavier particles of the mass to an air blast for removing the lighter particles entangled therewith and separating the whole nuts from the split nuts of said mass delivered from said surface.

15. The process of separating and grading nuts or the like, consisting in supporting the mass of nuts or the like on a transversely inclined roughened surface by a gaseous cushioning medium to permit stratification, removing the lighter particles of the mass stratified at the point of feed, imparting to said mass a positive movement across the movement of the mass by gravity, repelling the lighter particles of the mass, subjecting the heavier particles of the mass to an air blast at an angle to the movement of the particles by the propelling movement and delivering the separated nuts to a separating device for separating the whole from the split nuts.

16. An apparatus for separating and grading nuts or the like comprising a table having a pervious roughened surface, means for subjecting the material on said surface to a uniform upward pressure of air to permit stratification thereof, means for removing the lighter particles of the mass at the point of feed, means for propelling the material on said surface, and a screen disposed at the side of said table for receiving the separated nuts for separating the whole from the split nuts delivered thereto.

17. An apparatus of the kind described comprising a table gradually decreasing in width from the feed end toward the opposite end thereof, said table having a roughened pervious surface, an air chest disposed below said surface for subjecting the material on said surface to a uniform pressure of air to permit stratification of the material thereon, means for oscillating said table for propelling the material thereon, means for removing the lighter particles of the stratified mass at the point of feed, and a screen disposed at the delivery end of said table for separating the whole from the split nuts.

18. A blowing baffle for a separating table having a pervious surface with means for delivering a uniform upward pressure of air therethrough comprising a bar, a hollow baffle carried by said bar having a perforated under surface and a series of gates carried by said bar for regulating the exit of air therefrom.

19. A blowing baffle for a separating table having a pervious surface provided with means for maintaining a uniform upward pressure of air therethrough, comprising a supporting member having a hollow baffle provided with a perforated under surface and means for controlling the passage of air through said hollow baffle.

20. A banking block for a separating table having a pervious surface provided with means for maintaining a uniform pressure of air therethrough having a gate controlled opening for delivering an air blast across said surface at an angle to the uniform upward pressure of air therethrough.

21. A separating and grading apparatus comprising a transversely inclined pervious deck having means for maintaining a uniform upward pressure of air through said pervious deck, a baffle extending transversely across said deck having an air chamber provided with a perforated under surface, and gates for controlling the exit of air therethrough.

22. A separating and grading apparatus comprising a transversely inclined pervious deck, a hollow banking block disposed on said deck at the feed side thereof, said block having a gate controlled opening, and means for maintaining a uniform upward pressure of air through said pervious deck and banking block.

23. A separating and grading apparatus comprising a transversely inclined reciprocating pervious deck having means for maintaining uniform upward pressure of air through said pervious deck, and a screening unit disposed along side of said deck at the delivery end thereof.

24. A separating and grading apparatus comprising a transversely inclined pervious deck gradually decreasing in width from the feed end toward the opposite end thereof, said deck having a roughened surface, means for feeding graded material upon said deck, means for reciprocating said deck, said deck having delivery shelves and a screening unit carried by said deck at the delivery end thereof, for separating the whole from the split nuts delivered from said deck.

25. A separating and grading apparatus comprising a reciprocating pervious deck having a foraminous sheet of material arranged thereon to provide a roughened surface, means for maintaining a uniform upward pressure of air through said deck to permit stratification of the material thereon, means for removing the lighter particles of the mass stratified at the point of feed, and a screening unit carried by said deck at the delivery end thereof.

26. An apparatus of the kind described, comprising a reciprocating table provided with a pervious deck having a plurality of riffles, and in addition a plurality of pockets between the riffles in which certain particles are caught and propelled and separated from the other particles by said reciprocation of the table.

27. A separating and grading apparatus comprising a transversely inclined reciprocating pervious deck having means for maintaining uniform upward pressure of air through said pervious deck to permit stratification of material thereon, a screening unit disposed at the feed end of said deck for separating the smaller particles of the mass before it is delivered to said deck, a suction hood disposed at the point of feed for removing the lighter particles of the stratified mass, a blowing baffle disposed transversely across said deck, means for adjusting said baffle, and a hollow banking block arranged on said pervious deck having a gate controlled opening for delivering a blast of air at an angle to the air passing through said deck.

28. A banking block for a separating table having a pervious surface provided with means for maintaining a uniform pressure of air therethrough, provided with controllable means for delivering an air blast across said surface at substantially right angles to the movement of the material thereon.

29. The process of separating and grading nuts and the like consisting in feeding and supporting the mass of nuts upon a transversely inclined roughened pervious surface, gradually decreasing in width from the feed end toward the opposite end thereof, means for maintaining a uniform upward pressure of air through said roughened pervious surface, to permit stratification of the material thereon, means for removing the lighter particles at the point of feed and means at the delivery point for separating the whole from the split nuts.

30. The process of separating and grading a mass of nuts and the like consisting in gravitally feeding graded material upon a transversely inclined roughened pervious surface, to permit stratification thereof, removing the lighter particles of the mass at the point of feed, subjecting the lighter particles of the mass in its propelling movement to a repelling action subjecting the heavier particles of the mass to an air blast for removing the lighter particles entangled therewith, and delivering the separated nuts from said surface to a screening unit for separating the whole from the split nuts.

31. A separating and grading apparatus comprising a transversely inclined reciprocating pervious deck, having means for feeding material thereon, means for maintaining upward uniform pressure of air through said surface to permit stratification of the material thereon, a suction hood disposed above said surface at the point of feed for removing the lighter particles thereof, a banking block arranged over said pervious surface having a gate controlled opening for delivering an air blast to the heavier particles of the material at an angle to the movement of said material thereon, and means disposed at the delivery end of said table for separating the whole from the split nuts.

32. A separating and grading apparatus comprising a pervious deck having means for maintaining a uniform upward pressure of air therethrough, hollow baffles adjustably mounted above said surface, having perforated under surfaces forming air inlets, said baffles being provided with gate controlled outlets.

33. A separating and grading apparatus comprising a pervious deck, having means for maintaining uniform upward pressure of air therethrough, a hollow banking block disposed on said pervious deck, said banking block having a gate controlled opening for delivering an air blast across said deck at an angle to the movement of the material thereon.

34. A separating and grading apparatus comprising a transversely inclined deck having a pervious roughened surface, means for reciprocating said deck, causing the material thereon to move longitudinally across the movement of the material by gravity, hollow blowing baffles disposed transversely across said deck, having perforated under surfaces and gate controlled outlets and a hollow banking block disposed on said deck for delivering an air blast to the material thereon at an angle to the movement of the material thereon.

35. A separating and grading apparatus comprising a transversely inclined reciprocating pervious deck having a roughened surface and gradually decreasing in width from the feed end toward the opposite end thereof, means for delivering material from two sides of the deck and a screening unit for receiving the separated nuts carried by said deck for separating the whole from the split nuts delivered thereto.

36. The process of separating and grading nuts or the like consisting in supporting a mass of nuts upon the pervious roughened surface by a gaseous cushioning medium to permit stratification thereof, imparting to said mass propelling movement across the movement of the material by gravity, repelling the movement of the lighter particles of the mass in its propelling movement, separating the lighter particles of the mass from the heavier particles of the mass and then subjecting the mass to a screening action for separating the whole from the split nuts.

37. An apparatus for separating and grading nuts or the like comprising a transversely inclined reciprocating deck gradually decreasing in width from the feed end toward the opposite end thereof, said deck having a roughened pervious surface, a hollow banking block mounted on said deck at the feed side thereof, having a gate controlled opening and means for maintaining a uniform upward pressure of air through said surface and into said banking block.

38. An apparatus of the kind described comprising a reciprocating transversely inclined pervious deck gradually decreasing in width from the feed end toward the opposite end thereof, a screening unit disposed at the feed end of said deck for delivering grading material thereon, means for maintaining a uniform upward pressure of air through said roughened deck, to permit stratification of the material thereon, a suction hood disposed at the feed end above said deck, repelling baffles adjustably mounted above said deck, a blowing block disposed on said deck, means for maintaining an upward uniform pressure of air through said deck and the blowing block, and a screen disposed at the delivery end of said deck.

39. An apparatus for supporting and grading peanuts and the like comprising a transversely inclined deck gradually decreasing in width from the feed end toward the opposite end thereof, said deck having a roughened surface, means for reciprocating said deck, means for maintaining a uniform upward pressure of air through said deck, means for delivering graded material to said deck, means for removing the lighter particles from said mass at the point of feed, means for repelling the lighter particles of said mass in the movement of said deck, means for subjecting the heavier zone of particles to an air blast, and a screening unit carried by said deck at the delivery end thereof for separating the whole from the split nuts.

40. The process of separating and grading a mass of nuts, seeds or the like consisting in gravitally feeding the mass and supporting the same upon a transversely inclined surface by a gaseous cushioning medium to permit stratification thereof, propelling the mass upon said surface, banking the upper stratum of the mass before it is delivered from said surface and separately collecting the separated seeds or nuts.

41. The process of separating and grading a mass of nuts, seeds or the like consisting in gravitally feeding the mass of nuts or seeds and supporting the same upon a transversely inclined surface by a gaseous cushioning medium to permit stratification thereof, propelling the mass upon said surface, retarding the mass in its propelling movement, banking the upper stratum of imperfect nuts or seeds and separately collecting the imperfect seeds or nuts from the banked upper stratum.

42. The process of separating and grading nuts, seeds and the like consisting in feeding and supporting the mass of nuts upon a transversely inclined roughened pervious surface gradually decreasing in width from the feed end towards the opposite end thereof, means for maintaining a uniform upper pressure of air through said roughened surface to permit stratification of material thereon, means for propelling the mass of material upon said surface and means for separately collecting the upper stratum of imperfect seeds or nuts.

43. The process of separating and grading nuts, seeds or the like consisting in gravitally feeding the mass of nuts or the like and supporting the same upon a transversely inclined surface by a gaseous cushioning medium to permit stratification thereof, propelling the mass upon said surface, retarding the mass in its propelling movement, banking the upper stratum of imperfect nuts or the like and separately collecting the imperfect nuts or the like.

44. A separating and grading apparatus comprising a pervious deck having means for maintaining a uniform upper pressure of air therethrough, a hollow conveyor receptacle arranged along one edge of said table and a plurality of banking gates for closing said receptacle for banking and collecting the imperfect particles being separated.

45. A machine for separating and grading nuts, seeds or the like having a pervious deck with means for maintaining a uniform upper pressure of air therethrough, means for reciprocating the deck and a hollow conveyor receptacle having an open side arranged along one edge of the deck, the open side of said receptacle being closed by a plurality of adjustably mounted gates.

46. A separating and grading apparatus comprising a pervious deck having a plurality of adjustable banking and cutting gates along one edge thereof and a conveyor receptacle arranged in advance of said adjustable gates in a plane above the surface of the deck, said conveyor receptacle having a plurality of adjustably mounted gates.

47. An apparatus for separating and grading seeds, nuts or the like comprising a transversely inclined reciprocating deck gradually decreasing in width from the feed end to the opposite end thereof, a conveyor receptacle arranged along one edge of said deck in a plane above the surface thereof, said conveyor receptacle being provided with a plurality of independently operated gates.

48. An apparatus for separating and grading nuts, seeds or the like comprising a reciprocating deck having a supporting bar along one edge thereof, a plurality of gates slidably and revolubly mounted on said bar, a conveyor receptacle adjustably supported by said bar and normally held in the plane above the surface of the deck, and a plurality of gates for closing the open side of said conveyor receptacle.

49. A separating and grading apparatus comprising a pervious deck having means for maintaining a uniform upper pressure of air therethrough, a suction hood adjustably mounted above said deck at the feed end thereof only leaving the balance of the table exposed, and means for regulating the velocity of air passing through said hood.

50. A conveyor receptacle for a separating table having an open side provided with a plurality of adjustably mounted gates for closing the same.

51. A process of separating and grading a mass of nuts, seeds or the like consisting in gravitally feeding the mass of nuts, seeds or the like upon a transversely inclined surface and supporting the mass thereon by a gaseous cushioning medium to permit stratification thereof, propelling said mass on said surface, retarding the mass in its propelling movement and collecting from the upper stratum of said mass the imperfect seeds, nuts or the like.

52. An adjustable banking, cutting and conveyor bar for a separating and grading apparatus comprising a receptacle having an open side adapted to be supported in a plane above the surface of the apparatus and a plurality of gates for closing the open side of said receptacle.

53. An apparatus of the kind described comprising an air chamber having supporting ribs, a sheet of flat metal arranged upon said ribs having upset perforations forming a roughened surface, said sheet of metal being provided with a plurality of riffles.

54. An apparatus of the kind described comprising an air chamber having ribs, a flat sheet of metal arranged over said ribs having upset perforations to form a roughened surface, said sheet of metal having a plurality of riffles arranged to overlie the ribs of said air chamber.

55. An apparatus for separating and grading nuts, seeds or the like having a pervious deck formed of a sheet of metal having upset perforations to produce a roughened surface, said sheet of metal having a plurality of up-set riffles gradually decreasing in height from the feed end towards the delivery end thereof.

56. An apparatus for separating and grading material comprising an air chamber having a roughened pervious surface formed of a sheet of metal provided with upset perforations to produce pockets of substantially the same size as the material to be treated and means for maintaining a uniform upward pressure of air through said surface.

57. An apparatus for separating and grading nuts, seeds and the like comprising a deck having a pervious roughened surface, means for maintaining a uniform upward pressure of air through said deck and a conveyor receptacle arranged at an angle to the propelled movement of the material on said deck and in a plane above said deck for collecting the imperfect nuts or seeds from the perfect nuts or seeds.

58. A banking block for a separating table having a pervious surface provided with means for maintaining a uniform pressure of air therethrough, having means for delivering an air blast across said surface at substantially right angles to the movement of the material thereon.

59. An apparatus for separating and grading material comprising an air chamber having a roughened pervious surface provided with pockets of substantially the same size as the material to be treated and means for maintaining a uniform upward pressure of air through said surface.

60. An apparatus for the separation of the elements of a mass, comprising a pervious deck formed with waved portions for the purpose of increasing the hold on the mass, and riffles located on top of said deck.

61. An apparatus for the dry separation of elements of a mass, comprising a pervious deck with waved portions extending substantially at right angles to each other for the purpose of roughening its surface, and riffles located on top of said deck.

62. An apparatus for the dry separation of elements of a mass, comprising a metal pervious deck having its surface stamped with waved portions for roughening it, and riffles located on top of said deck.

In testimony whereof we have hereunto affixed our signatures.

HENRY MOORE SUTTON.
WALTER LIVINGSTON STEELE.
EDWIN GOODWIN STEELE.